US005407477A

United States Patent [19]

Reynolds et al.

[11] Patent Number: 5,407,477
[45] Date of Patent: Apr. 18, 1995

[54] THIXOTROPIC ORGANOCLAY ADDITIVE FOR HIGHLY VISCOUS SYSTEM

[75] Inventors: William Reynolds, Barnegat; Robert Van Doren, Lawrenceville; Charles A. Cody, Robbinsville, all of N.J.

[73] Assignee: Rheox, Inc., Hightstown, N.J.

[21] Appl. No.: 107,096

[22] Filed: Aug. 16, 1993

[51] Int. Cl.6 ............................................. C08L 95/00
[52] U.S. Cl. .................................. 106/284.2; 106/278; 501/148
[58] Field of Search ..................... 501/148; 106/284.2, 106/278

[56] References Cited

U.S. PATENT DOCUMENTS

| | | | |
|---|---|---|---|
| 4,743,305 | 5/1988 | Doidge et al. | 501/149 X |
| 4,769,078 | 9/1988 | Tso | 501/148 X |
| 4,857,491 | 8/1989 | Goodman | 501/148 X |
| 4,874,728 | 10/1989 | Eilliott et al. | 501/148 X |
| 5,110,501 | 5/1992 | Knudson, Jr. et al. | 501/148 X |

*Primary Examiner*—Karl Group
*Attorney, Agent, or Firm*—Michael J. Cronin

[57] ABSTRACT

Improved organophilic clay gellants for highly viscous systems such as asphalt and creosote can be prepared by a process wherein the smectite-type clay is gently dried and/or subjected to minimum or no grinding. The organophilic clay agent may be used to thicken a variety of organic compositions including pitch and heavy resins. In a preferred aspect, the organophilic clay gellant can be directly added to asphalt systems in order to efficiently and effectively modify the viscosity thereof without the use of either a polar activator as a dispersion agent or a preactivation agent.

4 Claims, No Drawings

THIXOTROPIC ORGANOCLAY ADDITIVE FOR HIGHLY VISCOUS SYSTEM

The present invention relates to thixotropic organoclay additives designed for highly viscous systems such as asphalt, pitch, tar and similar formulations. The additive described is an organoclay having enhanced dispensibility which can be dispersed into such systems without the use of a polar dispersant or a preactivator.

BACKGROUND OF THE INVENTION

There are in commercial use in the United States, Canada and Europe a number of organic coating systems utilizing highly viscous, thick coating compositions. The following paragraphs provide description of these systems, and a short list of their uses and their peculiar requirements as to rheology.

Asphalt has been utilized in the United States for at least a hundred years in a wide variety of commercial applications. Such uses include infrastructure construction uses, most particularly in the design and development of roads.

Asphalt is a brown-to-black-colored bituminous material with a pitchy luster. It is naturally occurring throughout the world. Approximately 98% of the asphalt used in the United States, however, is derived from oil by the removal of volatile, lighter-weight components from naturally occurring petroleum. The typical process separates these components by evaporation or fractionalization.

Asphalt is composed of heterocyclic and other hydrocarbon compounds containing sulfur, nitrogen and oxygen. Normal asphalt contains components with molecular weights from about 500 to about 5000. It is thermoplastic and viscoelastic. Asphalt is highly viscous; that is, at normal temperature it is of heavy consistency, almost gel-like. In some cases it is close to being non-fluid.

Of growing importance has been the use of special asphalt formulations designed for the coating of surfaces. These coatings are intended to protect such surfaces against weather, particularly water and rain, and to prevent the occurrence of damage such as rust. A major commercial business has developed in automotive undercoats, where asphalt is used to protect the under-surface of trucks, construction equipment, military vehicles, and automobiles from degradation caused by constant exposure to weather, water, snow and rain, road chemicals, and adverse climate. Almost all such vehicles in the United States and Canada have had an asphalt treatment applied to their underbody for these protective purposes.

Similar use of asphalt occurs in providing protective coatings for containers which are used to transport various types of goods and cargo, particularly over water, or where exposure to the elements of rain and snow are known to occur. Asphalt used for undercoats is called air-blown asphalt, and is produced by contacting asphaltic derivatives with pressurized air at a temperature of approximately 500° F. After application, the viscosity of such asphalt is less susceptible to temperature changes than is the type of asphalt used in highway construction.

While other types of application equipment, including brushes, are utilized, it is common practice to use spray equipment to apply asphalt for use as a protective coating. Spraying allows a large amount of product to be applied in a short time. It also permits constant operation by the connection of a product reservoir with pressurizing equipment, a pipeline, and a spray head. To be successfully applied using spray apparatus, asphalt must be capable of being made very liquid and "sprayable". Simultaneously and in contradistinction, following application the asphalt must not run or drip and must quickly, if not nearly instantaneously, become highly viscous.

To, achieve both effects, that is making asphalt virtually liquid during spraying and highly gelled without sagging or dripping shortly after application, thixotropic agents are generally employed. Such agents provide rheological properties to the asphalt system. In order to incorporate such agents, asphalt is normal heated to approximately 120° F. or higher to make the asphalt less viscous facilitating dispersion of the agent into the system.

Thixotropic agents can be defined as substances added to liquid systems which change the system's flow and viscosity properties. Proper rheology for flow and application must be balanced with the requirement of no sagging or dripping after application. The science of rheology, which is a part of the science of the deformation and flow of matter, in essence permits the application of shearing force, such as through the use of a spray apparatus, to effectuate a temporary change in the liquidity and viscosity of the system. When the force is removed (when the asphalt has been deposited on the coated surface) the system regains its initial high viscosity.

Creosote is an oily product of tar distillation, largely obtained in the modern era by carbonization of soft coal at high temperatures. It is also still made in some limited quantity from wood tar. Creosote oil makes up about 30% of coal and wood tar. Creosote finds large use in wood treatment as a protective coating, for exposed wooden surfaces and some additional use in the protection of fruit and walnut trees. Its successful application requires its incorporation in a system providing the same rheological properties previously described for asphaltic protective coating systems. At room temperature, creosote is gum-like and highly viscous. A highly viscous creosote system is generally a composition that at room temperature displays a viscosity of about $4 \times 10^6$ centipoise or greater (as measured with a Brookfield Helipath viscometer using a TF spindle at 2.5 rpm). Creosote application to wood and other surfaces therefore often requires the addition of thixotropic agents.

Pitch products are similar to asphalt and creosote. Pitch is the heavy, non-volatile residue of coal tar after fractional distillation to remove creosote and other lighter components. It may contain as many as 5000 separate chemical components. Pitch is used largely in commerce as a coating to protect flat roofs from weather, finding use in this regard as a protective membrane on the roofs of apartments, office complexes, parking garages, and other commercial buildings of many types. Its application to these various surfaces is at high temperature, and presents substantially similar use complexities as does asphalt and creosote although in come cases pitch is even more viscous than asphalt and creosote. Mastic, a glass-like yellow substance used in adhesives, and occasionally mixed with finely-powdered rock and/or asphalt, causes similar application concerns.

Organoclays, the reaction products of certain naturally-occuring clays and organic compounds, have found favor for a wide variety of uses, such as thickeners for drilling muds, paints, greases, and coatings, and as rheological additives for highly viscous products, particularly asphaltic systems. The leading such additive in commercial use for highly viscous systems is a product produced by the United Catalyst Company, Louisville, Ky., sold under the tradename Tixogel VP. This organoclay product is a fine powder made from smectite natural clay and a quaternary ammonium chloride salt. Tixogel VP requires the use of a polar activator when incorporated in an asphaltic system.

It is well known that organic compounds which contain a cation will react by ion-exchange with clays which contain a negative layer-lattice and exchangeable cations to form organoclay products. If the organic cation contains at least one alkyl group containing at least 6 carbon atoms, then such organoclays have the property of swelling in and thickening certain organic liquids. See for example U.S. Pat. No. 2,966,506.

Since the commercial introduction of organoclays in the early 1950's, it has also become well known that maximum efficiency for these organoclays is achieved by adding to the fluid to be thickened a low molecular weight polar organic material to the composition during the addition of the organoclay. Such polar organic chemicals have been variously called polar activators, dispersants, dispersion aids, solvating agents, dispersion agents and the like. As an alternative to polar activators, preactivating agents (which were often the same chemicals as polar activators), have been added directly to the organoclay and the resulting composite was then added to the composition to be thickened.

The use of such dispersion aids was found unnecessary when using specially designed organophilic clays derived from a specific class of defined benzyl quaternary ammonium compounds for use in premium oil well drilling fluids and similar high cost/high margin uses. See U.S. Pat. Nos. 4,105,578 Finlayson et al and 4,208,218 Finlayson. Neither reference teaches however the thickening of highly viscous systems such as asphalt, creosote, pitch or mastics.

Asphalt surface coatings require the use of relatively inexpensive raw material components in view of their major uses in undercoating of vehicles, and in construction. All cost-efficient organophilic clay thixotropic agents used in such systems have uniformly required the addition of a polar activator or a preactivating agent to permit dispersion of the organoclay into the asphalt system. In fact it is widely believed that the organoclays will not impart proper thixotropy without such additives. Efficient and accepted polar activators for use as dispersants have been found to include low molecular weight ketones and alcohols, most particularly acetone and methanol. These types of polar activators have low burning or flash temperatures and present special risks of fire, particularly in light of the elevated temperatures required for asphalt or pitch application. In addition such activators exhibit toxic properties, require the purchase and storage of a second chemical in addition to the organoclay, and present an additional time-consuming complication by adding another step in preparing an asphalt, creosote or pitch for use. Further, unless a specific polar activator to organoclay weight ratio is maintained, the system can degel, and thus lose all useful thixotropic properties.

Higher flash point products have been used for safety purposes as polar activators but these can be less efficient than either acetone or methanol. The leading commercial organoclay agent for asphalt systems in use at the present time requires the use of propylene carbonate as a polar activator. While less dangerous as to flammability than acetone, the cost of propylene carbonate is significant, and the inefficiencies of its purchase, storage and use have long been known. Importantly, propylene carbonate is and must be treated as extremely toxic. The most recent development in this area continues the use of propylene carbonate by dry-blending it with the organoclay rheological agent and finely divided silica before the resultant composite is added to the fluid to be thickened. See U.S. Pat. No. 5,186,747 issued Feb. 16, 1993.

In contrast to the prior art organoclay compositions, a thixotropic agent for asphalt and other highly viscous systems has been unexpectedly produced which does not require the addition of polar activators or preactivating agents, which agent is produced from the reaction of an organic quaternary compound with a cation exchangeable clay.

The clays used to prepare the organophilic clay additive of this invention are clays which have a cation exchange capacity of about 75 or greater milliequivalents per 100 grams of clay, 100 percent active basis (i.e. unsheared and essentially free of non-clay impurities). Types of clays considered applicable for best practice in the present invention are as follows:
A. Two-layer type (sheet structures composed of units of one layer of silica tetrahedrons and one layer of alimina octahedrons); 1. Kaolinite clays including kaolinite and nacrite; 2. Elongate, Halloysite clays;
B. Three-layer types (sheet structures composed of two layers of silica tetrahedrons and one central dodecahedral or trioctahedral layer:
1. Expanding lattice clays.
a. Equidimensional montmorillonite clays, including montmorillonite, sauconite and vermiculite.
b. Elongate montmorillonite clays including saponite.
2. Nonexpanding lattice Illite clays including mixed-layer types (ordered stacking of alternate layers of different types);
C. Chain-structure types (chains of silica tetrahedrons linked together by octahedral groups of oxygens and hydroxyls containing Al and Mg atoms) including attapulgite and sepiolite:
D. Some clays which by their generic reference fit into more than one of the above-described classification groups. "Generic reference" clays all have the common characteristic of containing aluminium silicate minerals: the major examples are 1) bentonite, and 2) "improved" activity clays. Bentonite clay is preferred in many situations. Bentonite has a high bonding power and reacts easily with many organic compounds.

Cation-exchangeable clays can also be manufactured, usually from a montmorillonite aluminum silicate clay. Such clays can be tailored with certain chemical and physical characteristics, in the course of the manufacturing process, in order to make such clays valuable in the practice of the present invention.

Particularly desirable types of clay are the smectite clays, including the naturally-occuring Wyoming varieties of bentonites and hectorite, a swelling magnesium-lithium silicate clay.

The clays, especially the bentonite type clays, are preferably converted to the sodium form if they are not already in this form. Representative of such clays are sodium montmorillonite, sodium and calcium bentonite, hectorite and stevensite. The cation exchange capacity of these smectite-type clays can be determined by the well-known methylene blue method. Chemical formula descriptions of such smectite clays are as follows:

Montmorillonite

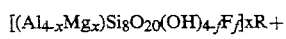

where $0.55 \leq X \leq 1.10$, $f \leq 4$ and R is selected from the group consisting of Na, Li, NH$_4$, and mixtures thereof;

Bentonite

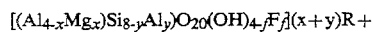

where $0 < x < 1.10$, $0 < y < 0$, $0.55 \leq (x+y) = 1.10$, $f \leq 4$ and R is selected from the group consisting of Na, Li, NH$_4$ and mixtures thereof; and Hectorite

where $0.57 \leq x \leq 1.15$, $f \leq 4$ and R is selected from the group consisting of Na, Li, NH$_4$, and mixtures thereof.

The organic cationic compounds which are useful in preparing the organoclays in this invention are selected from a range of materials that are capable of forming an organophilic clay by exchange of cations with the clay utilized. The organic cationic compound must have a positive charge localized on a single atom or on a small group of atoms within the compound. Preferably the organic cation is selected from the group consisting of quaternary ammonium salts, phosphonium salts, sulfonium salts and mixtures thereof wherein the organic cation contains at least one lineal or branched alkyl radicals having 6 to 22 carbon atoms. The remaining moieties on the central positively charged atoms are chosen from (a) lineal or branched alkyl radicals having 6 to 22 carbon atoms; (b) methyl; (c) aryl and alkyl groups such as phenyl; and (d) hydrogen.

The long chain alkyl radicals may be derived from natural occurring oils including mixtures of such oils and specialized derivatives of such oils with process-varied carbon chain length distributions. A number of vegetable oils, such as corn oil, coconut oil, soybean oil, cottonseed oil, castor oil and the like, as well as various animal oils or fats such as beef tallow can be used.

Many processes are known to prepare organic cationic salts. For example when preparing a quaternary ammonium salt one skilled in the art would prepare from the starting fatty acid a dialkyl secondary amine, for example, by the hydrogenation of nitriles, form the methyl dialkyl tertiary amine by reductive alkylation and then form the quaternary. The anion used to counterbalance the cations charge is preferably selected from the group consisting of chloride and bromide, and mixtures thereof, and is more preferably chloride, although other anions such as acetate, hydroxide, nitrite, etc., may be used. Quaternary chloride compounds are preferred and the compound dimethyl dihydrogenated ammonium chloride most preferred.

These catonic compounds can be represented by the formula:

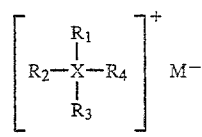

wherein X is nitrogen or phosphorus, M is selected from the group consisting of chloride, bromide, iodide, nitrite, hydroxide, acetate, methyl sulfate, and mixtures thereof; and $R_1$ is a linear or branched, saturated or unsaturated alkyl radical group having 6 to 22 carbon atoms; and wherein $R_2$, $R_3$ and $R_4$ are selected from the group consisting of hydrogen; methyl, alkyl radicals containing 6 to 22 carbon atoms, aryl groups; and mixtures thereof.

The organophilic clays of this invention can be prepared for example by mixing the clay and organic cation in water together as a slurry, preferably at a temperature within the range from 20° C. to 100° C., for a period of time sufficient for the organic cation to react by exchange reaction with the clay particles, followed by filtering, washing and drying. The clay is preferably dispersed in water at a concentration from about 1 to 10% and preferably 2% to 7% and the slurry optionally centrifuged to remove non-clay impurities which can constitute up to about 15% of the starting clay composition, the slurry agitated and heated to a temperature in the range from 60° C. to about 80° C. The slurry mixture is reacted with or without agitation.

Alternatively, organoclays can be prepared using a process whereby clay is blended with quaternary cationic compounds through an extruder to cause an exchange reaction. Typically the clay contains a small to moderate amount of water and the extruder device is commonly a pug mill.

The organic cation is employed in a sufficient quantity to nearly satisfy the cation exchange capacity (C.E.C.) of the clay. Additional cation above the sum of the exchange capacity of the clay may be optionally used. It has been found when using bentonite clay according to this invention that use of around 100 milliequivalents of organic cation is sufficient to satisfy such capacity as most commercial bentonite clays have a C.E.C. of around 100. Use of amounts from 90 to 200 milliequivalents (M.E.), and preferably 100 to 140 M.E for bentonite are acceptable. At lower milliequivalents ratios incomplete reaction between the orgnic cation and clay will occur resulting in the formation of somewhat ineffective although usable agents. It is to be understood that processing of the clay prior to reaction with cation will change the amount of cation necessary to produce a effective product. For example high shearing of smectite clay prior to reaction with a Manton-Gaul in machine will increase the clays capacity to react with cations by exposing more reaction sites on the clay. Conversely, for example, calcination of the clay with a heat treatment will decrease the clay's exchange capacity and less organic cation will be required.

One process for preparing the thixotropic agent of this invention may be described more particularly as:

(a) preparing a slurry of smectite-type clay in water at 1 to 20% by weight of said clay;

(b) adding an organic cation in a sufficient amount to satisfy the cation exchange capacity of the smectite-type clay while agitating the reaction solution;

(c) continuing the reaction for a sufficient time to form a reaction product comprising an organic cation which has reacted with the smectite-type clay;

(d) recovering the reaction product and (e) gently drying the reaction product.

Most prior art organophilic clays have been dried after reaction in hot air streams at temperatures as high as 300° C. While drying at lower temperatures is known, see U.S. Pat. No. 4,664,820 for example, such uses have never been known to produce organoclays usable as asphalt thickeners without the need for a polar activator. U.S. Pat. No. 4,664,820 specifically describes the requirement of the need of polar activators and list a large number of such agents, as well as preactivating agents performing the same function. 1,6-hexanediol is specifically highlighted as both a preferred polar activator and a preactivating agent.

In the process of the instant invention, after the organophilic clay is separated from the reaction mixture, it is preferably dried in a gentle manner. As previously mentioned, commercial organophilic clays have typically been dried in an airstream at elevated temperatures within the range of from about 120° to higher than 300° C. It has been found that more gentle drying conditions can lead to improved gellant performance in highly viscous systems. The gentle drying conditions are important to preserve and enhance the benefits obtained.

The gentle drying of the thixotropic agent in accordance with the present invention is conducted such that the wet organoclay reaction product should not exceed about 60° C. during drying. The organophilic clay, for example, can be dried in a fluidized bed which is maintained at a temperature in the range of from about 30° to about 125° C., preferably from about 25° to about 100° C. When a fluidized bed dryer is used, the temperature and air flow are selected such that quick evaporation of water keeps the temperature of the organoclay thixotropic agent in the bed below about 60° C. until it is almost dried. Another way of drying the organoclay is to dry it in a controlled hot airstream such that the temperature of the organoclay does not exceed 60° C. Other known drying techniques which keep the temperature of the organoclay below about 60° C. are also usuable for practicing the invention.

Another preferred process of the instant invention relates to the discovery that the coarseness of the organoclay particles significantly influences the effectiveness of the thickening of highly viscous systems. Such organoclay product works to thicken such systems regardless of the method of drying. The organoclay can after manufacture be utilized as a thixotropic agent without a drying step at all or only partially dried as long as the particle size remains coarse as described hereafter.

After organoclays have been dried they are typically ground using high pressure hammer mills or similar manufacturing grinding machinery to break up the organoclay, break apart the agglomerates and, because of the heat created in grinding, complete the organoclay's drying. Such ground commercial products typically have a particle size in the range of from about 1.0 to about 50-75 microns with an average particle size under 40 microns. One aspect of the instant invention changes, modifies or eliminates such grinding to produce a product of larger average particle size greater than about 40 microns up to as high as 200 microns with a preferred embodiment having an average particle size of 50 microns. The organoclay product, after drying, appears coarser usually because of such particle size increase and is more grainy and sand-like in appearance. A further aspect of this invention utilizes an organoclay produced by known processes which can either not be dried at all or only partially dried. Such organoclay is not ground or ground in such a way to have the particle size described.

The resultant organoclay produced utilizing the instant invention is an effective rheological agent for viscous systems, most particularly for asphalt and creosote, and when used as described permits the substantial elimination of the need for polar activators in dispersing the organoclay agent into such systems. It is believed that one reason a gently dried coarsely ground organoclay functions effectively in viscous systems without polar activators is because the particles readily wet-out in the fluid. The fluid to be thickened comes therefore more readily into contact with the organoclay particles. The high viscosity pitch-like products in which the instant thixotropic organoclay clays are useful include asphalt, creosote, mastics, heavy resins, pitch, thick gums, highly viscous waxes and the like. All systems generally require some heating to facilitate incorporation of the thixatropic agent. The organoclays produced using the processes described herein also have demonstrated improved performance in asphalt systems when used in combination with common polar activators.

The organophilic clay agent is employed in such compositions in amounts sufficient to obtain the desired rheological properties such as high viscosity at low shear rates, control of sagging of fluid films and prevention of settling. Amounts of the organophilic clay thixotropic agent employed in the viscous system involved should be between about 0.1% and about 10% based on the weight of the system and preferably between 0.3% and 5.0% to yield the desired rheological and thixotropic effects.

The following examples are given to illustrate the invention and illustrate the thixotropic properties of the inventive organophilic clays, but are not deemed to be limiting thereof. All percentages given throughout the specification are based upon weight unless otherwise indicated.

An asphalt formulation of the type typically utilized for automotive undercoats was prepared. The formulation with representative weight components is described in Table A.

TABLE A

| Commercial Asphalt/Petroleum Base Derived from Petroleum | 450 | |
|---|---|---|
| Talc | 115 | |
| Mineral Spirits | 100 | |
| | 665 | grams |

EXAMPLE 1

This example involved the addition to the asphalt formulation described in Table A of a commonly used polar activator, propylene carbonate, in the amount of approximately 1.5% of the weight of the formulation. The formulation was first brought to a temperature of 160° F. Various rheological additive samples were then dispersed in such formulation in an amount of about 3% of the weight of the formulation by use of a propeller blade of 1⅜ inch diameter rotated at a speed of approximately 630 feet/minute. Samples 3 and 4 were dried so not to exceed 60° C. during drying. The following results was obtained as initial data after 24 hours.

| Rheological Additive | Viscosity | | Leneta SAG* | |
|---|---|---|---|---|
| | 20 rpm (shaken) | 20 rpm | (mils) | (microns) |
| 1. Tixogel VP | 4680 | 4550 | 25/25 | 635/635 |
| 2. Organoclay A - hot air dried regular grind | 3300 | 3300 | 16/18 | 406/457 |
| 3. Organoclay A - dried in fluidized bed regular grind | 5960 | 5640 | 30/30 | 762/762 |
| 4. Organoclay A - not ground and dried in fluidized bed | 7400 | 8900 | 35/55 | 889/1397 |

*Undisturbed/shaken

Organoclay A was a bentonite clay reacted with dimethyl dihydrogenated tallow ammonium chloride.

The results in the above table show that a normal organoclay (Sample 2), when fluidized bed dried (Sample 3), improves in performance and when fluidized bed drying is combined with coarseness (Sample 4), results in a superior product.

EXAMPLE 2

This test utilized the same formulation of Table A again but in certain cases did not utilize the polar activator, propylene carbonate. In such cases, a small amount of water in the quantity noted was added. Various rheological additives in an amount of about 3%, except where noted, were dispersed into the formulation. Samples three to five were dried so not to exceed 60° C. during drying. The following results were obtained.

| Rheological Additive | Viscosity | | Leneta SAG* | |
|---|---|---|---|---|
| | 20 rpm (shaken) | 20 rpm | (mils) | (microns) |
| 1. Tixogel VP Propylene carbonate | 4400 | 3960 | 20/25 | 508/635 |
| 2. Tixogel VP with 1% water | 4480 | 2920 | 12/9.5 | 304/241 |
| 3. Organoclay A unground with 0.1% water (no propylene carbonate) | 13300 | 9980 | 37.5/40 | 953/1016 |
| 4. Organoclay A unground with 0.8% water at a 2.5% loading (no propylene carbonate) | 14750 | 6300 | 37.5/60 | 953/1520 |
| 5. Organoclay A unground with 1% water (no propylene carbonate) | 25600 | 14700 | 60+/60+ | 1524+/1524+ |

*Undisturbed/Shaken

The above example demonstrates that organoclays prepared according to the invention substantially enhance thickening of an asphalt system without the use of a polar activator.

EXAMPLE 3

Certain of the sample formulations from Example 2 were passed through a Eiger horizontal mill at one half charge of media for 1 pass at 150° F. (approximately 2000–2500 PSI) to evaluate the effects of a circulating pump which may be added to a normal mix tank in actual use. The use of the Eiger Mill is a higher shear device than that used in Examples 1 and 2. The addition of such a pump likely would enhance the effectiveness of a rheological additive as well as aid in the elimination of entrapped air bubbles in the formulation. The results were:

| Rheological Additive | Prior data (Viscosity) | One Pass through Eiger Mill |
|---|---|---|
| 1. Tixogel VP | Visc. 4480/2920 Sag. 11/280 | 5600/4650 22.5/580 |
| 2. Organoclay A with 1% water (no propylene carbonate) | Visc. 25600/14720 Sag 60+/1524+ | 32000/24000 60/1524+ |

The results show that the use of moderate shear improves the performance of the organoclays of the instant invention with the performance of the product markedly improved.

EXAMPLE 4

An experiment was conducted to compare the difference between the coarseness of the grinding where the effort of drying was minimal. This was accomplished by taking a coarse organoclay (i.e. a product which passed through a 40 mesh screen to remove large particles), freezing it in liquid nitrogen, grinding it to a smaller particle size while frozen, thawing it and then testing.

Two rheological organoclay additive packages were prepared as follows (all weight measurements are in grams):

| | Formulation #1 | Formulation #2 |
|---|---|---|
| S600 mineral spirits at 180° F. | 82.7 | 82.7 |
| Organoclay Agent I particle size passed a 40 mesh screen (approximately 55 microns; average particle around 50 microns) | 12.0 | — |
| Organoclay - Organoclay Agent I frozen and further ground in a Brinkman Mill | — | 12.0 |
| Corrosion inhibitor | 1.3 | 1.3 |
| Water | 4.0 | 4.00 |
| Total | 100.00 g | 100.00 g |

The above two additive packages were dispersed into 200 grams of an asphalt formulation which was at a temperature of 140° F. The resultant product was checked for viscosity with a TF spindle operating at 2.5

RPM with the following result demonstrating the superiority of Formulation #1:

Formulation #1—396,000 cps.
Formulation #2—349,600 cps

This experiment demonstrates that Formulation #1 was superior and that the coarser ground sample was the more effective thixatropic agent.

EXAMPLE 5

A partially dried organoclay was prepared by reacting dimethyl dihydrogenated tallow ammonium chloride with bentonite clay—the organoclay contained approximately 13.0% moisture. The organoclay was taken directly from the manufacturing process and no grinding step was performed on it at all. When tested as per Example 3 (no water addition used) it was found to have viscosity build performance and sag control approximately 425% better than a sample of Tixogel VP.

The above results demonstrate that the organoclay thixotropic agents of this invention impart substantially higher viscosities and better sag rheology to an asphalt system then the comparison examples. Such comparison examples include Tixogel VP, the most noteworthy present commercial additive for asphalt use. Importantly such organoclays work in this superior manner without the need for the use of an inconvenient, costly and potentially dangerous polar activator.

The invention being thus described, it will be obvious that the same may be varied in many ways. Such variations are not to be regarded as a departure from the spirit and scope of the invention and all such modifications are intended to be included within the scope of the following claims.

What is claimed is:

1. A composition comprising an asphalt system having dispersed therein without the addition of a polar activator an organophilic clay thixotropic agent and water, which agent comprises: the reaction product of an organic cation, and a smectite clay having a cation exchange capacity of at least 75 milliequivalents per 100 grams of said clay such that the cation exchange sites of the smectite clay are substituted with the organic cation, and where said thixotropic agent has been dried so that its temperature did not exceed about 60° C. during drying, and it has been processed in such a manner to be composed of coarse particles of an average particle size greater than about 50 microns, and wherein said organophilic thixotropic agent comprises from 0.25 to 10% by weight of said composition.

2. The composition of claim 1 wherein the smectite clay is selected from the group consisting of hectorite and sodium bentonite.

3. A composition comprising an asphalt system having dispersed therein without the addition of a polar activator, an organophilic clay thixotropic agent and water, which agent comprises: the reaction product of an organic cation, and a smectite clay having a cation exchange capacity of at least 75 milliequivalents per 100 grams of said clay such that the cation exchange sites of the smectite clay are substituted with the organic cation, and where said thixotropic agent has been processed in such a manner to be composed of coarse particles of an average particle size greater than about 50 microns, and wherein said organophilic clay thixotropic agent comprises from 0.25 to 10% by weight of said composition.

4. The composition of claim 3 wherein the smectite clay is selected from the group consisting of hectorite and sodium bentonite.

* * * * *